(12) United States Patent
Jain et al.

(10) Patent No.: US 9,017,897 B2
(45) Date of Patent: Apr. 28, 2015

(54) METAL COMPOSITE MATERIAL FOR ATTACHMENT TO CERAMIC

(71) Applicant: Delphi Technologies, Inc., Troy, MI (US)

(72) Inventors: Kailash C. Jain, Troy, MI (US); Joseph V. Bonadies, Clarkston, MI (US); Matthew Osterhout, North Street, MI (US); Rod R. Stilgenbauer, Fenton, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/713,554

(22) Filed: Dec. 13, 2012

(65) Prior Publication Data

US 2014/0170529 A1 Jun. 19, 2014

(51) Int. Cl.
 *H01M 8/10* (2006.01)
 *H01M 4/86* (2006.01)
 *B32B 9/00* (2006.01)

(52) U.S. Cl.
 CPC ............. *H01M 4/8657* (2013.01); *B32B 9/005* (2013.01); *H01M 4/8652* (2013.01); *Y02E 60/50* (2013.01)

(58) Field of Classification Search
 USPC .......................... 429/482, 483, 486, 489, 495
 See application file for complete search history.

(56) References Cited

U.S. PATENT DOCUMENTS

| | | | | |
|---|---|---|---|---|
| 4,332,871 | A * | 6/1982 | Charkey ......................... | 429/217 |
| 5,908,713 | A * | 6/1999 | Ruka et al. .................... | 429/484 |
| 6,818,192 | B2 * | 11/2004 | Hosono et al. ................ | 423/115 |
| 2002/0172726 | A1 * | 11/2002 | Hosono et al. ................ | 424/688 |
| 2004/0214069 | A1 * | 10/2004 | Seabaugh et al. ............... | 429/40 |
| 2011/0086270 | A1 * | 4/2011 | Amos et al. .................... | 429/219 |
| 2011/0143255 | A1 * | 6/2011 | Jain et al. ....................... | 429/489 |

\* cited by examiner

*Primary Examiner* — Stewart Fraser
(74) *Attorney, Agent, or Firm* — James M. Chan

(57) ABSTRACT

A sintered solid composite material is disclosed that includes a metal and a calcium alumina compound. The metal can be a noble metal. This composite material can bond to a ceramic material, and an article is disclosed that includes a first ceramic layer bonded to a second layer of the composite material of metal and calcium alumina compound. The ceramic can be a mixed ionic and electronic conductor (MEIC), and/or have a perovskite crystal structure, and/or be a mixed oxide comprising lanthanum, strontium, cobalt, iron and oxygen. The article can be used as an electrode such as a cathode of a solid oxide fuel cell.

11 Claims, 4 Drawing Sheets

METAL COMPOSITE MATERIAL FOR ATTACHMENT TO CERAMIC

STATEMENT REGARDING GOVERNMENT SUPPORT

This invention was made with Government support under DE-FC26-02NT41246 awarded by DOE. The Government has certain rights in this invention.

BACKGROUND OF THE INVENTION

Metals are commonly adhered to ceramic materials for various applications. For example, electrochemical sensors, electrolyzers, solar cells and other devices utilize ceramic materials in electrical or electrochemical applications, and often have a metal layer, sheath, or other configuration attached to the ceramic material for collection of electrical current from the ceramic material.

One type of device that utilizes a metal to ceramic connection is a solid oxide fuel cell (SOFC). Fuel cells for combining hydrogen and oxygen to produce electricity are well known. One known class of fuel cells is referred to as solid oxide fuel cells. An SOFC generally consists of a cathode and an anode physically separated by a solid oxide electrolyte, and electrically connected by an external electrical circuit. During operation of an SOFC, oxygen is provided to the cathode of the cell while hydrogen-containing fuel is provided to the anode. Oxygen is catalytically reduced at and diffuses through the cathode to reach the solid electrolyte. The solid electrolyte is permeable to the oxygen anions, which diffuse across the electrolyte to the anode where they combine with hydrogen to form water and release electrons, which flow through the external circuit to the cathode to provide the source of electrons for the catalytic reduction of oxygen, thereby generating electricity.

The cathode of an SOFC must satisfy a combination of criteria, including but not limited to catalytic activity, electrical conductivity (both ionic and electronic conductivity), electronic structure, stability, structural integrity, thermal expansion, and the like, all at operating conditions such as high temperatures in excess of 800° C. A class of materials that have used for SOFC cathode applications is the mixed ionic and electronic conducting (MIEC) materials such as perovskite-type $ABO_3$ oxides. The general chemical formula for perovskite compounds is $ABX_3$, wherein 'A' and 'B' are two cations of very different sizes, and X is an anion that bonds to both. The native titanium mineral perovskite itself is of the formula $CaTiO_3$. The 'A' atoms are larger than the 'B' atoms. The ideal cubic-symmetry structure has the B cation in 6-fold coordination, surrounded by an octahedron of anions, and the A cation in 12-fold cuboctahedral coordination. The relative ion size requirements for stability of the cubic structure are quite stringent, so slight buckling and distortion can produce several lower-symmetry distorted versions, in which the coordination numbers of A cations, B cations, or both are reduced.

Mixed oxide materials comprising lanthanum (La), strontium (Sr), cobalt (Co), and iron (Fe), also known as "LSCF", of have been proposed in the prior art as materials for SOFC cathodes due to their high catalytic activity for the oxygen exchange reaction and a high electronic conductivity for current collection. One proposed formulation is characterized by the general formula $La_{1-x}Sr_xCo_{1-y}Fe_yO_{3-\delta}$. The physical and chemical properties of this class of materials, such as electrical conductivity, electronic structure, catalytic activity, stability, and thermal expansion coefficient (TEC), have been studied in detail. Generally, electronic and ionic conductivities and catalytic activity are enhanced with increasing values of x and decreasing values of y, whereas there is an opposite tendency for chemical stability.

It has been proposed to use a thin, porous, catalytic, & stable metal film is to establish an equipotential surface and a structure on a perovskite cathode surface that is complementary to the reactions occurring in the air electrode of a SOFC. Proper functioning of metal/oxide interfaces in applications such as SOFC cathodes depends upon electronic interaction (interfacial charge redistribution), and chemical interaction (interfacial atom transport). Further, formation of chemical bonds is a mechanism for charge transfer at the metal/oxide interfaces. The interaction of a metal with a mixed conducting oxide such as LSCF where both electronic and ionic defects are mobile depends on both ionic and electronic conductivities.

To reduce the cathode resistance for intermediate temperature SOFC's noble metals, such as Ag, Pt, Rh, Pd etc. and their alloys have been investigated. Ag and its alloys are attractive due to high permeability, conductivity, and catalytic activity of oxygen through Ag. However, due to the low melting point of Ag at 962° C., Ag—Pd (e.g., with Pd present at 10-30 wt. %) alloy films have been proposed instead. Pd films have been proposed as well. These films can be applied to an LSCF cathode by screen printing a paste of metal powder in an organic resin binder, followed by sintering. However, many of the proposed metal films have been subject to poor adhesion to the ceramic cathode material.

Random large area holes, limited continuity, loose refractory particles, and poor adhesion can decrease the active area for oxygen exchange reaction, thus limiting the contribution of noble metal in reducing cathode resistance. Further in order to draw power from the cell, a metal current collecting screen is typically attached to the electrode using the similar metal powder pastes to those used for the metal film. If the metal has a poor bond with the ceramic, the quality of contact to the current collecting structure is therefore also compromised and can lead to delamination.

It is desirable to obtain metal films and contacts with good adhesion to ceramics, controlled porosity, and a uniform microstructure. Although many of the materials proposed for metal ceramic/metal interfaces have been effective to varying degrees, alternative materials that offer better performance, reliability, cost, or combination of these or other parameters.

SUMMARY OF THE INVENTION

These and other advantages and features will become more apparent from the following description taken in conjunction with the drawings.

As described in further detail below, a sintered solid composite material comprises a metal and a calcium alumina compound. In some exemplary embodiments, the metal can be a noble metal. This composite material can bond to a ceramic material, and in some embodiments, an article comprises a first layer comprising a ceramic bonded to a second layer comprising a metal and calcium alumina compound. In some exemplary embodiments, the ceramic can be a mixed ionic and electronic conductor (MEIC), and/or have a perovskite crystal structure, and/or be a mixed oxide comprising lanthanum, strontium, cobalt, iron and oxygen.

In some embodiments, an article comprising the ceramic layer bonded to a layer comprising a metal and calcium alumina compound can be an electrode. More specifically, the electrode can be a cathode of a solid oxide fuel cell.

BRIEF DESCRIPTION OF THE DRAWINGS

The foregoing and other features, and advantages of the invention are described in the following detailed description taken in conjunction with the accompanying drawings in which.

DETAILED DESCRIPTION

Figure 1:
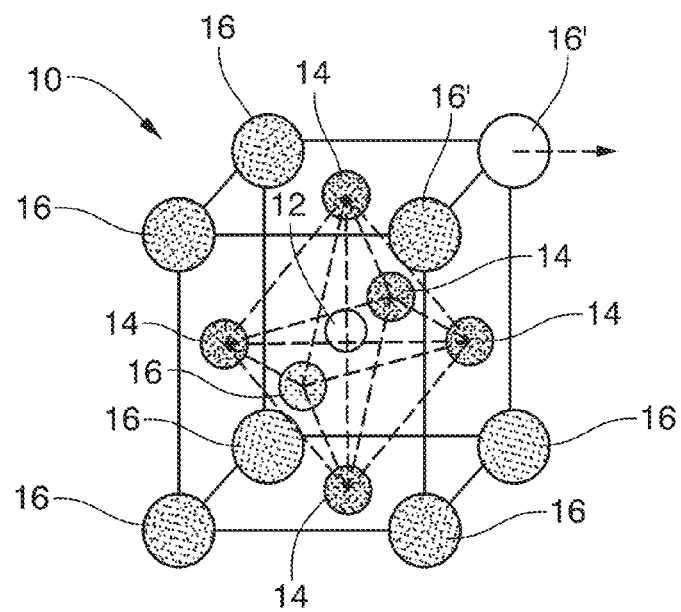
FIG. 1 depicts a perovskite crystal structure.

The metal composite material described herein can be prepared by a number of different techniques. In some embodiments, the composite material is prepared by preparing the calcium alumina compound via a solid state reaction of $CaCO_3$ and $\gamma$-$Al_2O_3$ metal powders with a desired molar ratio of calcium to alumina (e.g., 12:7). This reaction is brought about by first physically mixing the calcium carbonate and aluminum oxide powders (e.g., by ball milling in solvent), followed by heating in air or other oxygen-containing atmosphere. Heating conditions can range from 1100° C. to 1400° C. for a period of 8-16 hours. Multiple mixing and heating steps may be utilized to achieve the desired crystal structure. In an exemplary embodiment, calcium carbonate and aluminum oxide powders can be ball milled, crushed, subjected to a first heating step (e.g., 1350° C. for 6 hours), followed by crushing and re-milling the material and then heating again in air or oxygen. This material can then be milled again to achieve desired particle surface area morphology (e.g., 8-12 $m^2$/g), after which it can be mixed with metal powder into a resin paste, deposited onto a ceramic substrate (e.g., by screen printing), and then sintered.

Another way to prepare the composite material described herein is via a solution approach in which a calcium alumina compound material is first prepared from soluble salts such as nitrate salts of calcium and aluminum. Exemplary nitrate salts include $Ca(NO_3)_2 \cdot 4H_2O$ and $Al(NO_3)_3 \cdot 9H_2O$. The nitrate salts can be dissolved in water and/or solvent (e.g., ethanol), followed by addition of urea, and then heated to produce an oxide powder, which can be further refined by heating as described above (e.g., at 1100° C. for 16 hours) to produce a final calcium alumina compound material. This calcium alumina compound material can then be ball milled to the desired size and mixed with metal powder into a resin paste as described above.

Another exemplary way to prepare the composite material involves contacting the above-described solution of nitrate salts with a metal powder, drying the metal powder and then heating (e.g., at 500° C. for 30 minutes). The resulting powder is seen to have similar crystalline structure to the above-described composite materials prepared from metal powder and calcium alumina compound powder.

The relative amounts of calcium and aluminum in the calcium alumina compound can vary depending on the performance parameters. In some embodiments, the calcium alumina compound has a molecular ratio of calcium to aluminum of from 12:14 to 12:7 (equating to a molar ratio of calcium (e.g., from CaO) to alumina ($Al_2O_3$) of 12:3.5 to 12:7), more specifically a molecular ratio of about 12:14 (equating to a calcium to alumina molar ratio of about 12:7). In some embodiments, the calcium alumina compound is represented by the formula 12CaO—$XAl_2O_3$, where X is 3.5 to 7, more specifically 12CaO-7$Al_2O_3$.

Calcium alumina compounds can be used to form composite materials with a variety of metals, more specifically with a noble metal. Exemplary noble metals include silver, palladium, platinum, rhodium, ruthenium, gold, osmium, iridium, and mixtures or alloys comprising one or more of the above. In more specific embodiments, the metal is silver, palladium, or an alloy of silver and palladium having from 10 wt. % to 30 wt. % Pd. The amount of calcium alumina compound present can vary depending on the desired properties of the composite material. In some embodiments, the relative amounts of calcium alumina compound and metal can range to yield a calcium alumina compound content of from 0.01 wt. % to 1.0 wt. %, more specifically from 0.2 wt. % to 0.4 wt. %.

In some embodiments, the composite materials described herein can be bonded to a ceramic material, e.g., to function as and/or to provide an electrical connection to a current collector on a SOFC electrode, an electrochemical sensor or other ceramic to which a metal connection is required. Exemplary ceramic materials include any of the known ceramic to which a metal bond is needed. Exemplary ceramics include $ZrO_2$, $CeO_2$ (doped or undoped), $Al_2O_3$, and MgO, to name a few. In some embodiments, the ceramic is a mixed ionic and electronic conductor (MEIC), such as LSCF, LSCF+ceria doped with samarium, gadolinium, or neodymium, lanthanum strontium ferrite (LSF), or samarium strontium cobalt (SSC), with or without doped ceria. In some embodiments, the ceramic has a perovskite crystal structure.

An exemplary perovskite crystal structure is depicted in FIG. 1, where a perovskite lattice structure 10 comprises a central B-site cation 12 surrounded by a square double pyramid lattice of six oxygen ions 14 in turn surrounded by a cubic lattice of eight A-site cations 16. An exemplary perovskite crystal is shown in FIG. 1. An exemplary perovskite crystal structure can be derived from a mixed oxide of lanthanum, strontium, cobalt, and iron having the elements in the ratio $La_{0.6}Sr_{0.4}Co_{0.2}Fe_{0.8}O_{3-\delta}$, where δ is 0-0.2. These materials, also known as LSCF 6428 materials, comprise perovskite crystal structures where the A-sites are occupied by La and Sr ions, and the B-sites are occupied by Co and Fe ions that surround oxygen ions 14. Other ceramic materials known to form perovskite crystal structures include LSF, SSC, and lanthanum strontium cobalt (LSC). As known in the art, the mixture from which an LSCF 6428 material is formed is not required to precisely match the 6:4:2:8 molar ratio of La:Sr:Co:Fe, and it is known in the art to modify the ratio of components so that some of the A-sites, such as site 16', which would otherwise hold an La or Sr ions, are left vacant. Various compositions such as $La_{1-x}Sr_xCo_{1-y}Fe_yO_{3-\delta}$ or $(La_{0.6}Sr_{0.4})_{1-z}Co_{0.2}Fe_{0.8+b}O_{3-\delta}$, have been proposed as a mixed ionic and electronic conducting ("MIEC") material for use as or in a solid oxide fuel cell cathode. Other LSCF materials of the 6428 type are disclosed in US pat. app. publ. no. 2011/0143255 A1, the disclosure of which is incorporated herein by reference in its entirety. Such LSCF 6428 materials can be characterized by the formula $La_{1-x-2z}Sr_{x+z}Co_{0.2+a}Fe_{0.8+b}O_{3-\delta}$, where x can equal 0.4, z can be 0 to 0.1, a can be 0.01 to 0.04, and b can be 0.05 to 0.15.

A solid state ceramic material comprising lanthanum, strontium, cobalt, and iron can also include other materials such as ionic conductors, which can promote the formation of an ionic conducting phase in the final solid state material. Exemplary doped ceramic metal oxides include $Y_2O_3$, $Gd_2O_3$, $Nd_2O_3$, $Sm_2O_3$, or $Yb_2O_3$, doped with Sm, Y, Gd, Yb, or Nd (the dopant being different than the primary metal atom in the ceramic matrix). In more specific embodiments, the doped ceramic metal oxide can be Sm-doped ceria. Ionic conductors like doped ceramic metal oxides can be included in an amount of from 0 wt. % to 50 wt. %, more specifically from 10 wt. % to 30 wt. %, of the amount of the LSCF mixed oxide [see discussion. The doping level may be about 3 mole % to about 30 mole %, more specifically about 10 mole % to about 20 mole %. The amount of ionic conducting phase in the MIEC material may be varied from about 0 wt % to about 60 wt %, more specifically about 25 wt % to about 50 wt %. In some embodiments, an SOFC cathode will include a layer or segments comprising LSCF and an ionic conductor like samaria-doped ceria (SDC), also referred to an SDCF layer or segment, which have mixed ionic and electronic conductivity with a higher level of ionic conductivity than other portions of the electrode formed from LSCF without the ionic conductor. In other embodiments, the ionic conductor (e.g., SDC) can be uniformly dispersed.

The mixtures out of which the solid state LSCF materials are formed can also include a pore former. The purpose of a pore former is to enable the formation of low resistance gas diffusion paths. Pore formers are materials that decompose to leave the desired porosity in the sintered layer. For example, carbon black, starch, graphite, and non-soluble organics may be used as pore formers. The amount of pore formers may vary from about 0 wt % to about 100 wt % of the solid phase or even higher, more specifically from 10 wt % to 50 wt %.

Ceramic materials such as a solid state LSCF material can be prepared by sintering techniques where powdered ceramic material is mixed with resin binder to form a paste, which is then deposited onto a substrate like an anode-supported electrolyte and sintered under conditions conducive to solid state sintering. Solid state sintering is well-known in the art and is characterized by grain growth that occurs in so-called "neck regions", i.e., interstitial spaces between grains of the material being sintered are filled with new crystals or grain growth from atoms that have diffused from the initial grains to the neck regions. This growth of new material in the neck regions between the grains transforms the individual grains into a solid state cohesive material. Of course, a certain degree of porosity is needed in order for oxygen to be able to diffuse through an SOFC cathode, so solid state sintering is typically controlled to limit the amount of grain growth into the neck regions of the material in order to provide desired physical and electrical properties while maintaining desired levels of porosity.

The composite metal material can be bonded to a ceramic material by depositing a sintering paste of powder comprising the metal and the calcium alumina compound in a resin binder onto a sintered or non-sintered (i.e., green) ceramic material, followed by sintering. The resin can be any of the known types for making pre-sintering pastes, including polyvinylbutyral, ethylcellulose, or acrylic, and is typically present in an amount of 8-20 wt. %, more specifically 10-18 wt. %, and even more specifically about 15 wt. %, based on the total weight of the binder vehicle used for making the paste. The paste can be deposited on a suitable support such as a MIEC ceramic SOFC cathode and sintered to form the solid material. Other techniques for applying the composite material to a ceramic include thermal spray techniques such as plasma spray and spin coating.

Figure 2:
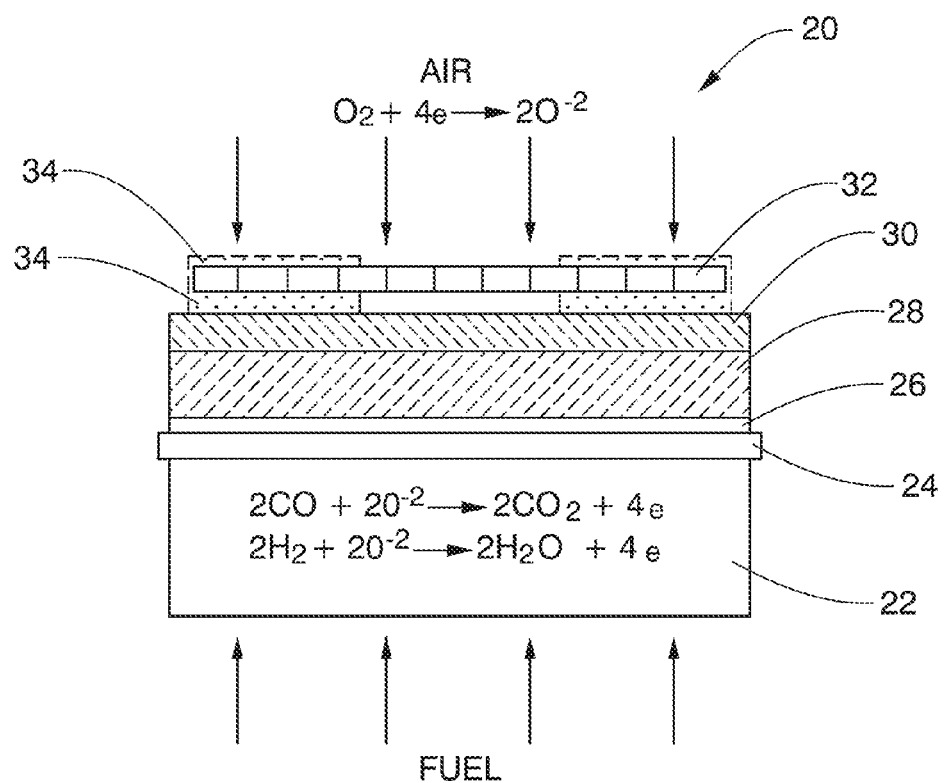
FIG. 2 schematically illustrates an exemplary solid oxide fuel cell configuration as described herein.

An exemplary use of the composite metal materials described herein is as a metal layer on an SOFC electrode (e.g., cathode) and/or as a bonding material for bonding a metal current collector screen to an SOFC electrode (e.g., cathode). An exemplary fuel cell structure is set forth in FIG. 2. As shown in FIG. 2, solid oxide fuel cell 20 has an anode 22 such as a Ni—YSZ anode disposed on one side of YSZ electrolyte 24 such as a YSZ electrolyte. On the other side of electrolyte 24 is disposed a cathode that includes porous SDCF layer 26, LSCF layer 28, and metal layer 30, which can have a thickness of from 0.5 micron to 10.0 micron, more specifically 1 micron to 5.0 microns. A current collecting screen 32, which can be formed from a metal such as silver, silver palladium alloy, or silver coated steel, is attached to the cathode with a conductive metal bond 34, which can be formed from a sintering paste of a binder and a metal powder. In exemplary embodiments, either or both of the metal layer 30 or the conductive metal bond can be formed from a metal composite material as described herein such as a composite of a noble metal and calcium alumina compound.

Although the operation of the present invention is not bound by any particular theory, it is believed that a modality applicable to some embodiments of the invention is that the presence of the calcium alumina compound in the metal material can reduce or impact electronic interaction (conductivity) at the interface between the metal material and the ceramic material, thus impacting the characteristics of the bond between the two materials.

The invention is further described below in the following non-limiting example(s).

EXAMPLES

Example 1

Figure 3:
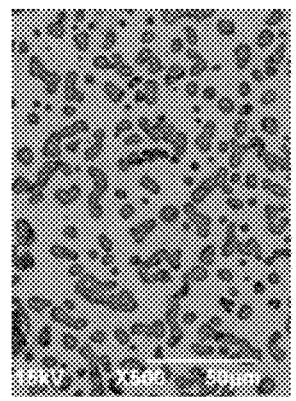
FIGS. 3a-3c depict photomicrographs of an exemplary article as described herein.
Figure 3:
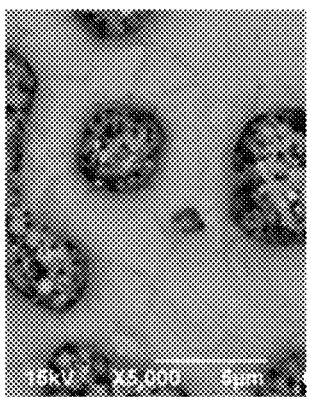
Figure 3:
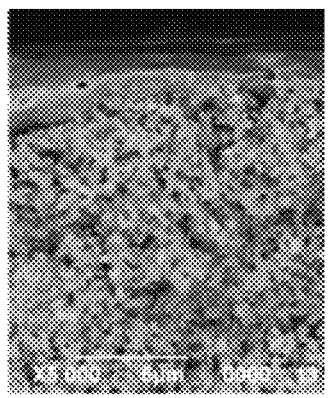

Calcium alumina compounds, in particular $12CaO.7Al_2O_3$ (C12A7) is prepared by a solid-state reaction of $CaCO_3$ and $\gamma$-$Al_2O_3$ powders with a molar ratio of 12:7. The two powders are mixed and solvent milled to homogenize for 12 to 24 hours, dried (120° C.) and heated at 1350° C. for 6 hours in air at atmospheric pressure. The material is then crushed, milled, and reheated to 1100° C. for 16 hours under flowing air or preferably under oxygen to accommodate $O^{2-}$ ions in the crystal structure. The heated material is then re-milled to achieve a surface area of about 8-12 $m^2/g$ and 0.35 wt. % of the material is added to an 85 wt. % Ag—Pd paste and mixed using a three roll mill. On a 2.54 cm size fuel cell with a 2.5 $cm^2$ LSCF pre sintered cathode (1050° C.), the noble metal film is screen printed, dried, and heated to 1000° C. for 1 hour. The resulting microstructure of the noble metal film is shown in FIGS. 3a-3c. FIGS. 3a & 3b show film continuity and a unique micro structure with micro, macro, & nano pores in the plan view. Further a cross-sectional SEM image in FIG. 3c shows improved adhesion to the oxide surface. The films are highly adherent and do not delaminate on a pull test even when a glass tape is used. A comparison with a similar noble metal film having no calcium alumina compound shows that the adhesion and microstructure of the film is greatly improved, which would result in reduced contact resistance and overall resistance of the electrode during fuel cell operation.

Example 2

Figure 4:
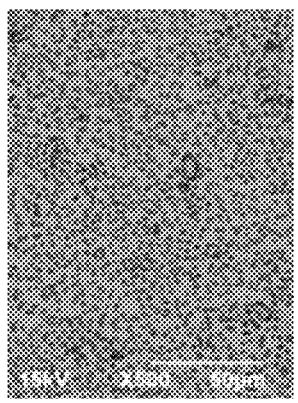
FIGS. 4a-4c depict photomicrographs of an exemplary article as described herein.
Figure 4:
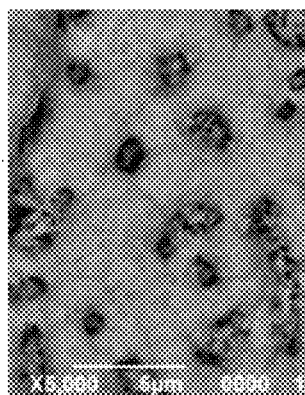
Figure 4:
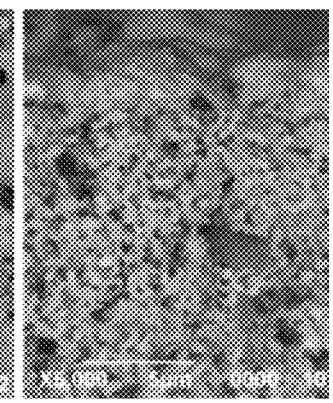

Starting powders of $Ca(NO_3)_2.4H_2O$ and $Al(NO_3)_3.9H_2O$ were weighed in 12:7 ratio of nitrate salts ($12CaO:3.5Al_2O_3$)

and then dissolved in a distilled water ethanol (0.6:1) mixture at room temperature to yield a 0.01M stock solution. Into this solution 114g of urea ($CH_4N_2O$) was added. Following the dissolution of urea in the solution, the contents were transferred into an alumina crucible and heated to about 500° C. The process yielded a foamy, voluminous, and fine oxide powder within 15 minutes. The foamy precursors were lightly ground into a fine powder and then calcined in a $Al_2O_3$ crucible in an air atmosphere at 1100° C. for 16 hours to form the crystalline calcium alumina compound binary compound. The material was crushed and sieved to realize a powder with a surface area of 6.9 $m^2/g$. This material, 0.25 wt. % (250 ppm), was added to a 33% solids Pd paste and mixed using a three roll mill. The Pd film was screen printed on a 2.54 cm size fuel cell with a 2.5 $cm^2$ LSCF cathodes sintered at 1050° C. dried and heated to 1000° C. for 1 hour. The resulting microstructure of the noble metal film is shown in FIGS. 4a-4c. FIGS. 4a & 4b show film continuity and a unique micro structure with micro, macro, & nano pores in the plan view, and x-sectional SEM image FIG. 4c shows improved adhesion to the oxide surface. These films did not delaminate on a pull test even when a glass tape was used. A comparison with a similar film without any calcium alumina compound shows that the adhesion and microstructure of the film is greatly improved, which would result in reduced contact resistance and overall resistance of the electrode during fuel cell operation.

Example 3

Figure 5:
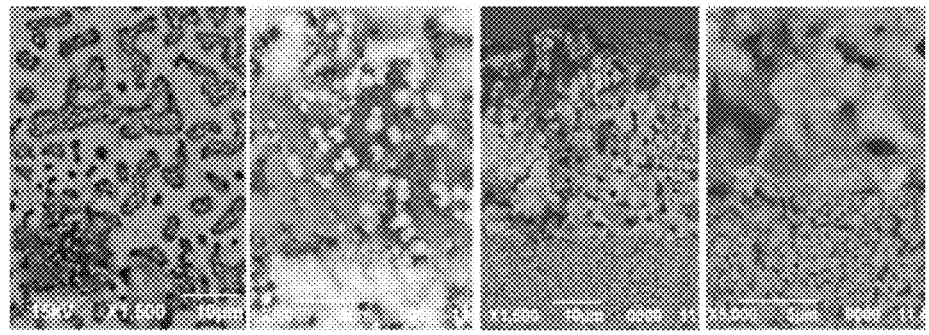
FIGS. 5a-5d depict photomicrographs of an exemplary article as described herein.

In another variation, the above nitrate solution is further diluted with water and ethanol to contain an amount of salt components equivalent to 0.25 g of calcium alumina compound in a 15 g of solution. This solution is then used to wet 100 g of palladium powder, dried at 110° C. for 1 hour, and heated to 500° C. for 30 minutes. The resulting powder was then converted to three pastes using a three roll mill. The first two pastes had a 33% solids loading. The first paste also had 0.5 wt. % LSCF in addition to the calcium alumina compound. The second and third pastes were without any LSCF. The third paste has a 71% solids loading for making thick paste dots such as for attaching current a collecting screen. On two 2.54 cm size fuel cells having a pre-sintered (1050° C.) LSCF cathode with a 2.5 $cm^2$ active area, the first two pastes were screen printed, dried, and heated to 1000° C. for 1 h. On the second cell, several paste dots from the third paste were stencil printed, dried (110° C.), and sintered at 850° C. The resulting microstructure of the metal film and contact region is shown in FIGS. 5a-5d. FIGS. 5a and 5b are plan views at ×1500 and ×5000 showing film continuity, a unique micro structure with micro, macro, & nano pores, and attached LSCF particle in the film. SEM images FIGS. 5c and 5d from paste 2 (without LSCF) in x-section show about 2 μm Pd with an about 30 μm Pd region suitable for attaching a current collecting screen. The combination of thin film & thicker region sintered at 850° C. shows uniform bonding, porous microstructure, & excellent adhesion to the LSCF oxide surface. These films do not delaminate on a pull test even when a glass tape is used. A comparison with a similar film having no calcium alumina compound in the metal layer shows that the adhesion and microstructure of the film is greatly improved and the contact resistance is possibly reduced. These results also show that simple nitrate salt solution treatment of the noble metal (Ag, Ag—Pd alloy, Pd etc.) at relatively low temperature, 500° C. range (300° C.-700° C.), is sufficient to reproduce the desired microstructure, bonding, and porosity conductive to electrode reaction and detailed laborious process to prepare calcium alumina compound compounds and subsequent processing steps can be avoided. For Ag—Pd alloy powder 350° C. (250° C.-500° C.) is preferred to avoid gross sintering of the powder before converting to a paste.

Example 4

Figure 6:
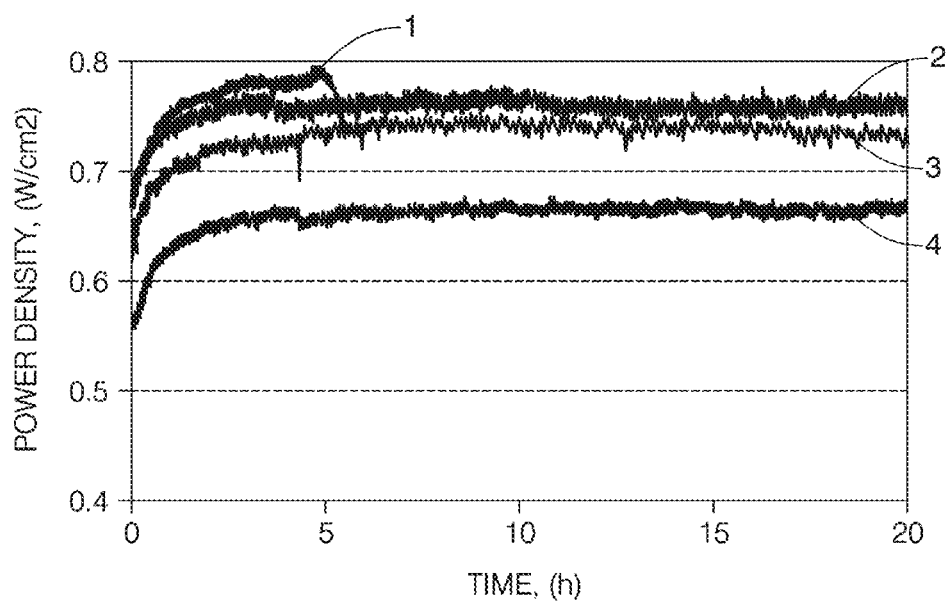
FIG. 6 is a power density plot of a solid oxide fuel cell prepared as described herein.
Figure 7:
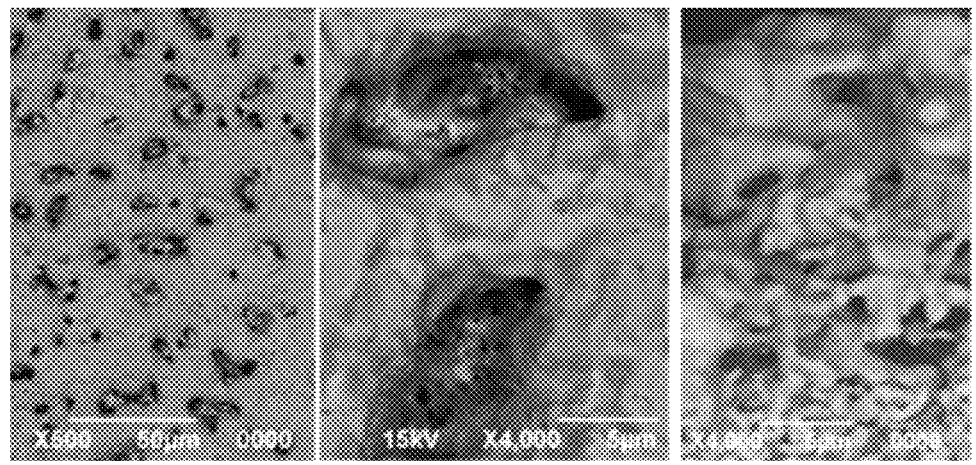
FIGS. 7a-7c depict photomicrographs of exemplary solid oxide fuel cell layers prepared as described herein.
Figure 8:
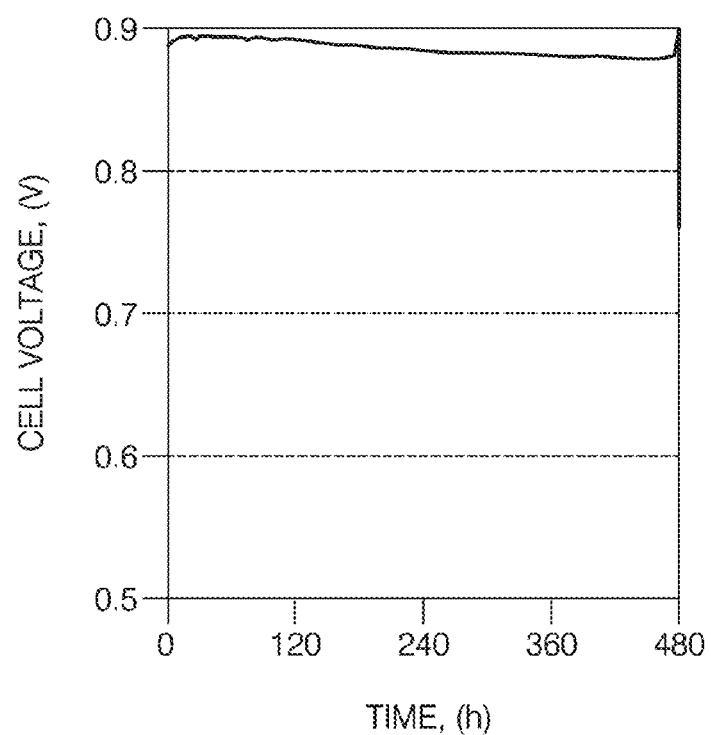
FIG. 8 is a plot of cell voltage as a function of time of a solid oxide fuel cell prepared as described herein.

In order to demonstrate the reduction in total resistance of the cathode electrode five 1" size cells with pre sintered LSCF cathode with a 2.5 $cm^2$ active area noble metal films were screen printed, dried, and heated to 1000° C. Two cells were control cells with standard Ag—Pd and Pd thin films and thick contacts. The other cells had Ag—Pd or Pd with calcium alumina compound additives in the noble metal pastes for both thin film and thick (about 20-30 μm) contacts, as described herein. Current collecting screens were attached and heated to 850° C. to form the cathode electrodes. Cell fabrications were completed by attaching anode electrode leads. For measuring power density performance, the air and fuel sides of the cells were isolated using a glass sealing material. The NiO/YSZ composite anode was reduced, in situ, at 800° C. for 1 hour in a hydrogen gas atmosphere (50% $H_2$ in $N_2$). The cathode side of the cell was exposed to flowing air at a rate of 2.3 liters/min and the anode side was exposed to a flowing stream of 50% hydrogen at a rate of 2.3 liters/min. The electrochemical measurements were conducted at 750° C. using a potentiostat/galvanostat (Parstat® 2273) and power-generating characteristics as a function of time for the four cells (two test and two control) were measured at a polarization potential of 0.8 V. FIG. 6 shows a comparison of power density of cells represented by control group and this ROI. In FIG. 6, curve 1 represents a test cell using an Ag—Pd noble metal paste with calcium alumina additive, curve 2 represents a test cell using a Pd noble metal paste with calcium alumina additive, curve 3 represents a control cell using an Ag—Pd noble metal paste with no calcium alumina additive, and curve 4 represents a control cell using a Pd noble metal paste with no calcium alumina additive. As shown in FIG. 6, the cells having noble metals with calcium alumina additives provided higher (~10-15%) and relative stability of power density with time demonstrated the reduction in overall resistance of the air electrode. FIGS. 7a, 7b, and 7c are plan views and cross-section. These images show porosity retention, continuity, & bonding of the metal film to LSCF substrate with time. The fifth cell was tested at constant current of 0.6 $A/cm^2$ and variation in cell voltage was measured for about 480 hours to study the effect of long term operation and aging. FIG. 8 shows stability of cell voltage as a function of time for a 2.54 cm fuel cell (2.5 $cm^2$ active area) operating at 750° C. in 50% $H_2$ in $N_2$ at a constant current of 0.6 $A/cm^2$. Pull test on this cell after the 480 hours test resulted in delamination in the LSCF cathode showing that the current collecting screen, thin, and thick regions of the metal film were inseparably bonded to the perovskite LSCF cathode.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A fuel cell comprising:
a cathode layer comprising a ceramic, and a second layer comprising a metal and calcium alumina compound, wherein said second layer is bonded onto a surface of said cathode layer.

2. The fuel cell of claim 1, wherein the ceramic is a mixed ionic and electronically conductive ceramic.

3. The fuel cell of claim 2, wherein the ceramic comprises lanthanum, strontium, cobalt, iron and oxygen.

4. The fuel cell of claim 3, wherein the ceramic comprises perovskite structures comprising lanthanum, strontium, cobalt, iron and oxygen.

5. The fuel cell of claim 1, wherein the metal comprises a noble metal.

6. The fuel cell of claim 5, wherein the noble metal is silver or palladium.

7. The fuel cell of claim 1, wherein the calcium alumina compound has a molar ratio of calcium to alumina of 12:7 to 12:3.5.

8. The fuel cell of claim 7, wherein the calcium alumina compound has a molar ratio of calcium to alumina of about 12:7.

9. The fuel cell of claim 1, wherein the calcium alumina compound is $12CaO\text{---}XAl_2O_3$, where X is 3.5 to 7.

10. The fuel cell of claim 1, wherein the second layer comprises from 0.01 wt. % to 1.0 wt. % of the calcium alumina compound.

11. The fuel cell of claim 10, wherein the second layer comprises from 0.2 wt. % to 0.4 wt. % of the calcium alumina compound.

* * * * *